(12) United States Patent
Tengvert et al.

(10) Patent No.: US 11,097,931 B2
(45) Date of Patent: Aug. 24, 2021

(54) MATERIAL HANDLING VEHICLE AND A MATERIAL HANDLING SYSTEM COMPRISING SUCH A VEHICLE

(71) Applicant: Toyota Material Handling Manufacturing Sweden AB, Mjölby (SE)

(72) Inventors: Peter Tengvert, Motala (SE); Henrik Larsson, Motala (SE); Marcus Molin, Linköping (SE)

(73) Assignee: Toyota Material Handling Manufacturing Sweden AB, Mjölby (SE)

( * ) Notice: Subject to any disclaimer, the term of this patent is extended or adjusted under 35 U.S.C. 154(b) by 55 days.

(21) Appl. No.: 16/391,680

(22) Filed: Apr. 23, 2019

(65) Prior Publication Data
US 2019/0322505 A1    Oct. 24, 2019

(30) Foreign Application Priority Data

Apr. 23, 2018  (EP) .................................... 18168811

(51) Int. Cl.
*B66F 9/06*    (2006.01)
(52) U.S. Cl.
CPC .................................. *B66F 9/063* (2013.01)
(58) Field of Classification Search
CPC ....................................................... B66F 9/063
USPC ................................................. 700/213–230
See application file for complete search history.

(56) References Cited

U.S. PATENT DOCUMENTS

| | | | | | |
|---|---|---|---|---|---|
| 3,552,659 A | * | 1/1971 | Meyer | ....................... | B60P 1/16 239/657 |
| 3,885,808 A | * | 5/1975 | Derrwaldt | ................. | B60S 9/16 280/81.1 |
| 4,081,094 A | * | 3/1978 | Pereira | ....................... | B60P 1/38 414/439 |

(Continued)

FOREIGN PATENT DOCUMENTS

| | | |
|---|---|---|
| EP | 1640255 A1 | 3/2006 |
| EP | 2826693 A2 | 1/2015 |

(Continued)

OTHER PUBLICATIONS

European Patent Office. Extended European Search Report for application 18168811.0, dated Oct. 22, 2018. 10 pages.

*Primary Examiner* — Michael Collins
(74) *Attorney, Agent, or Firm* — Quarles & Brady LLP

(57) ABSTRACT

A material handling vehicle comprises an upper loading surface for loading of objects thereon, a control unit, a power source, a drive motor, at least one vehicle drive wheel powered by the drive motor, at least one vehicle support wheel, a first chassis and a second chassis, each of which comprises at least one wheel of the vehicle. The first and second chassis are pivotally coupled to each other by means of at least one coupling means, wherein said coupling means is arranged intermediate the first chassis and the second chassis at a position where the first chassis is arranged above the second chassis, wherein the coupling means extend at least partly vertically between the first and second chassis at said position. Further there are two drive wheels that are independently controllable. Further, a material handling system comprising at least one such material handling vehicle.

15 Claims, 6 Drawing Sheets

(56) References Cited

U.S. PATENT DOCUMENTS

| | | | | |
|---|---|---|---|---|
| 4,128,137 | A * | 12/1978 | Booth | B62D 7/00 180/6.5 |
| 4,572,311 | A | 2/1986 | Oswald | |
| 4,762,192 | A * | 8/1988 | Maxwell | B60P 3/40 180/14.2 |
| 4,799,697 | A * | 1/1989 | Williamson | B60D 1/66 180/19.3 |
| 5,108,250 | A * | 4/1992 | Fewin, Jr. | B60P 1/38 198/301 |
| 5,765,859 | A * | 6/1998 | Nowell | B60G 7/00 280/43.17 |
| 7,744,331 | B2 * | 6/2010 | Ellis | B62B 5/02 414/476 |
| 9,707,879 | B2 * | 7/2017 | Mecklinger | B66F 9/063 |
| 10,245,935 | B2 * | 4/2019 | Lord | B60K 7/00 |
| 10,549,916 | B2 * | 2/2020 | Pajevic | B60P 1/649 |
| 2004/0164505 | A1 * | 8/2004 | Clemens | B60K 7/0023 280/6.154 |
| 2005/0034903 | A1 | 2/2005 | Wu | |
| 2006/0011403 | A1 * | 1/2006 | Sjoberg | B62D 1/02 180/326 |
| 2006/0061116 | A1 * | 3/2006 | Haaberg | B60P 3/14 296/37.6 |
| 2010/0078232 | A1 * | 4/2010 | Adachi | B66F 9/063 180/12 |
| 2013/0166063 | A1 * | 6/2013 | Panzram | B64D 9/003 700/229 |
| 2015/0091262 | A1 * | 4/2015 | Bekoscke | B60G 21/005 280/5.508 |
| 2016/0231751 | A1 * | 8/2016 | Mecklinger | B60P 1/02 |
| 2016/0297361 | A1 * | 10/2016 | Drazan | H04N 7/188 |
| 2017/0028900 | A1 * | 2/2017 | Stocks | B60P 3/42 |
| 2017/0144502 | A1 * | 5/2017 | Bae | B60G 17/015 |
| 2018/0072212 | A1 * | 3/2018 | Alfaro | G05D 1/0278 |

FOREIGN PATENT DOCUMENTS

| | | |
|---|---|---|
| EP | 3199487 A1 | 8/2017 |
| FR | 2875207 A1 | 3/2006 |
| JP | 2978682 B2 | 11/1999 |
| JP | 3561814 B2 | 9/2004 |
| WO | 2004094291 A2 | 11/2004 |

* cited by examiner

MATERIAL HANDLING VEHICLE AND A MATERIAL HANDLING SYSTEM COMPRISING SUCH A VEHICLE

CROSS REFERENCE TO RELATED APPLICATIONS

The application claims the priority benefit of European Patent Application EP 18168811.0 filed Apr. 23, 2018, the contents of which is hereby incorporated by reference as if set forth in its entirety.

TECHNICAL FIELD

The present disclosure relates to a material handling vehicle and to a material handling system comprising such a vehicle according to the appended claims.

BACKGROUND

Generally in material handling situations, in particular order picking in a warehouse, floor conveyors, forklifts, tiller trucks etc., are used. There are numerous advantages with these types of vehicles: they can be arranged to lift heavy goods, they can be easily operated by a trained operator, they are in general not demanding a considerable investment and they are often rugged and have a considerable life expectancy. It is possible to adapt these vehicles by changing load carriers and also by applying a mast such that goods can be fetched from considerably heights. It is even possible to apply a cabin that is lifted into the air in order to allow for the operator that performs order picking to pick at considerable heights. By order picking at considerable heights, the warehouse can be very dense in terms of the base area. It is also possible to help the operator in numerous ways in order to increase the efficiency of order picking. For example it is possible to increase the travel speed of the floor conveyor by allowing the operator to temporarily ride with the floor conveyor on a platform.

SUMMARY OF THE INVENTION

When utilizing material handling vehicles such as an AGV (Automatic Guidance Vehicle), handling of objects such as pallets and rolling carts may be made easier as such vehicles may alleviate cumbersome operations related to lifting, moving, etc. Such vehicles are also often used in combination with a forklift and similar equipment, wherein a forklift may be used to place and retrieve objects and material at and from such a material handling vehicle. Such AGVs may have various designs and functions depending on their indented usage, wherein design choices such as the total number of wheels may affect how the vehicle functions in both positive and negative manners.

As an example regarding handling of such a vehicle, if a total of three wheels are arranged to a vehicle, the vehicle will exhibit an excellent manoeuvrability as three wheels are pretty much guaranteed to be in contact with an underlying surface. However, three wheels may also not have the best stability if loaded with heavy objects as the centre of gravity must be positioned within an area defined by contact points between the wheels (the footprint) and the underlying surface, and a total of three wheels limits this area by means of the triangular shape of said area as a result of using three wheels. A vehicle having a total of four wheels will be much more stable as the rectangular shape provided by four wheels is easier to expand to a larger area, and as such vehicles are often rectangular, or close thereto, in shape, four wheels may be positioned close to the four corners of such a vehicle wherein stability is improved. However, when using a total of four wheels it can be more difficult to guarantee all four wheels contact with an underlying surface if said surface comprises debris and/or an uneven structure. Furthermore, the internal pressure of the at least one drive wheel may thus not remain constant as the amount of force distributed over the total number of wheels may vary depending on the circumstances.

Despite prior art there is a need to develop an improved material handling vehicle which is versatile with regards to material handling operations with regards to manoeuvrability of the vehicle. There is also a need to develop such a material handling vehicle which provides an improved pressure in its at least one drive wheel, which in turn provides a safer vehicle to operate with respect to speed and handling. Further, there is also a need to develop a material handling system which comprises and utilizes such a material handling vehicle.

An object of the invention is thus to provide an improved material handling vehicle which is versatile with regards to material handling operations with regards to manoeuvrability of the vehicle. Another object is respectively to provide such a material handling vehicle which provides an improved pressure in its at least one drive wheel, which in turn provides a safer vehicle to operate with respect to speed and handling. An even further object is to provide a material handling system which comprises and utilizes such a material handling vehicle.

According to a first aspect a material handling vehicle is provided. The material handling vehicle may comprise: an upper loading surface for loading of objects thereon, a control unit, a power source, a drive motor, at least one vehicle drive wheel powered by the drive motor, at least one vehicle support wheel. Further, the vehicle may comprise a first chassis and a second chassis, each of which may comprise at least one wheel of the vehicle, wherein the first and second chassis are pivotally coupled to each other by means of at least one coupling means. The coupling means may further be arranged intermediate the first chassis and the second chassis at a position where the first chassis is arranged above the second chassis, wherein the coupling means extend at least partly vertically between the first and second chassis at said position. The vehicle may comprise two independently controlled drive wheels for powering and steering the material handling vehicle and at least two support wheels, wherein at least one of the support wheels is arranged at the first chassis and one other support wheel and the two drive wheels are arranged at the second chassis. At least one of the support wheels can be a swivel wheel.

This has the advantage that a versatile material handling vehicle is provided, which vehicle exhibits improved manoeuvrability by means of the wheels being arranged at both the first and the second chassis which are pivotally coupled to each other by means of the at least one coupling means. As the first and second chassis may pivot relative each other, the total number of wheels arranged at the vehicle, and their positioning, may be selected in a more flexible manner as the relative pivoting of the first and second chassis allow for a distribution of force to be spread out amongst the total number of wheels in a more equal manner. For certain configurations of said wheels, it may not be guaranteed that all wheels are provided with the same contact pressure depending on the shape of the footprint of the vehicle. By means of allowing for a relative pivoting between the first and second chassis, wherein at least one wheel is arranged at each chassis, a larger number of wheels may be used in total for the vehicle while still providing a more reliable contact pressure between each wheel and a surface underneath. This is especially beneficial for a drive wheel as a more reliable contact with a surface in turn provides a more reliable manoeuvrability from said drive wheel due to said drive wheel can exhibit a more reliable constant pressure and thus contact with an underlying surface. The coupling means being arranged in at least partly a vertical manner has the advantage that there are more options with regards to how a force may be transferred from the first chassis to the second chassis. Such a force may thus be applied from the first chassis to the second chassis in a direction and a position which relates to applying a force to an upper surface of the second chassis instead of a purely moment inducing force applied to a side portion of the second chassis, which could be the case if the coupling means was to be arranged as a horizontal coupling of the first and second chassis being pivotally coupled in series in a horizontal plane. This may further be utilized in a manner wherein the force of the first chassis (or combined with a force from a potential object positioned at the upper loading surface of the first chassis) acting on the second chassis may be arranged so as to better distribute said force over any amount of wheels comprised at the second chassis. This in turn provides the benefit of achieving a better control over internal pressure of any said wheels arranged at the second chassis, which may provide a better manoeuvrability and thus also an improved safety of the vehicle.

A further advantage is that a vehicle may be provided with an additional wheel compared to if the same amount of wheels were to be arranged at a one-piece chassis without the ability to pivot. As the vehicle is able to pivot about the coupling means, an increased number of wheels may be in reliable contact with a surface underneath as the two chassis may change their independent angled orientation relative said surface underneath. As a larger number of wheels provides a better stability, if all wheels are in proper contact with a surface underneath, it is beneficial to be able to increase said number of wheels. This is achieved by means of the distribution of wheels among the first and second chassis, wherein the pivoting between the two hence provides this option to the vehicle. The vehicle may thus be provided with the manoeuvrability of a vehicle comprising three wheels while at the same time be provided with the stability of a vehicle comprising four wheels. By providing two independently controlled drive wheels an excellent manoeuvrability is achieved. By further providing that at least one of the support wheels is a swivel wheel further improved manoeuvrability is achieved. Also the wear of the support wheel set is reduced, and manoeuvring under load is made easier.

According to an aspect the position of the coupling means is arranged in an imaginary vertical plane, which divides the second chassis into two sub-sections, a first sub-section and a second subsection, wherein the two drive wheels are arranged at the first sub-section and the one other support wheel of the second chassis is arranged at the second sub-section of the second chassis.

This has the advantage that a force acting through the coupling means, on the second chassis from the first chassis, will be divided between the two drive wheels and the one other support wheel, while guaranteeing that said force from the first chassis is acting on the second chassis within a footprint of the second chassis, said footprint being defined by the three wheels of the second chassis. This is beneficial as the three wheels of the second chassis may align themselves with an underlying surface independently of the first chassis and it's at least one support wheel, wherein this provides a more constant contact pressure between the drive wheels arranged at the second chassis and said underlying surface. This in turn promotes a more safe and reliable manoeuvrability of the vehicle.

According to an aspect the coupling means is arranged to the first chassis by means of a first sliding arrangement, selectively operational for moving the coupling means along a longitudinal direction of the first chassis.

This has the advantage that a distance between the centre of gravity of the first chassis (with or without load) and the coupling means may be selectively operated so as to affect the sizes of the resulting forces of the first split, which first split divides the force from the first chassis between the at least one support wheel and the coupling means. This may be used as an advantage as it in turn corresponds to how large the resulting force between the at least one drive wheel and an underlying surface will be. The first sliding arrangement may thus be used to modify said resulting force as a means to strive for a suitable such force with regards to traction and manoeuvrability of any drive wheel, and thus the manoeuvrability of the vehicle.

According to an aspect the coupling means is arranged to the second chassis by means of a second sliding arrangement, selectively operational for moving the coupling means along a longitudinal direction of the second chassis.

This has the advantage that distances between the coupling means and the wheels of the second chassis may be selectively operated so as to affect the sizes of the resulting forces of the second split, which second split divides the force coming from the first chassis between the one other support wheel and the at least one drive wheel. This may be used as an advantage as it directly corresponds to how large the resulting force between the at least one drive wheel and an underlying surface will be. The second sliding arrangement may thus be used to modify said resulting force as a means to strive for a suitable such force with regards to traction and manoeuvrability of any drive wheel, and thus the manoeuvrability of the vehicle.

An even further advantage may be achieved if combining the features of the first sliding arrangement with the second sliding arrangement. Such a combination has the advantage of providing the possibility of modifying the distances associated with both the first split and the second split, performed simultaneously or separate. This also provides an option of moving the coupling means along both sliding arrangements while keeping the positioning of the first and second chassis relative each other unchanged. Hence, forces applied to any drive wheel of the vehicle may be modified without altering the total length of the vehicle. However, the possibility of operating only one of the sliding arrangements may of course still be available if desired.

According to an aspect the vehicle, which comprises a first and/or a second sliding arrangement further comprises sensor means arranged for monitoring the amount of force applied to the at least one drive wheel, wherein the control unit is arranged to control the positioning of the coupling means relative at least one sliding arrangement based on a value given by said sensor means, so as to adjust said amount of force to the at least one drive wheel.

This has the advantage that the forces acting on the at least one drive wheel may be automatically adjusted based on the monitored value given by the sensor means. The vehicle may thus be set up so as to automatically lower or increase the forces distributed to the at least one drive wheel as a means of providing as constant operation conditions as possible for the drive wheels. This in turn provides a more reliable and safe vehicle which may be used at higher speeds and with greater accuracy due to a more constant and reliable pressure within the at least one drive wheel.

According to an aspect the vehicle further comprises a tilting device, arranged for controllably tilting the first chassis relative the second chassis about the at least one coupling means.

This has the advantage that the first chassis may be a tipper device for the vehicle. This may hence be used as a means of allowing objects positioned at the upper loading surface to slide or roll off said surface for certain loading operations. It may also be utilized as a means of easier cleaning of the upper loading surface, wherein accumulated dust, debris or similar present on the upper loading surface may be tipped off by means of tilting the first chassis.

According to an aspect the vehicle further comprises at least one stopping element, arranged so as to restrict the pivoting of the first and the second chassis relative each other, so that said pivoting may not exceed a predetermined angle.

This has the advantage that the pivoting of the first and second chassis is only possible within a predetermined range, wherein the pivoting may be prevented to exceed said range so as to prevent a too large pivoting which could result in potential failure and/or additional stress to the coupling means.

According to an aspect the coupling means comprises at least one pivot shaft about which the first and second chassis may pivot relative to each other.

This has the advantage that the coupling means may pivot about the pivot shaft in a controlled manner. The relative pivoting of the first and second chassis may thus only occur in two directions, clockwise and counter-clockwise about the at least one pivot shaft which corresponds to the pivot axis of the construction.

According to an aspect the coupling means comprises a universal joint or a ball joint, as non-limiting examples, about which the first and second chassis may pivot relative to each other in a plurality of directions.

This has the advantage that vehicle may pivot about said universal joint so as to distribute forces over the wheels of the vehicle as described, and also at the same time be able to for example pivot as a result if a torque is applied to the vehicle, said torque being applied along a longitudinal direction of the vehicle. Such a torque may be the result when loading an object on the upper loading surface, wherein said loading and/or object results in a large shift of the centre of gravity for the vehicle. If such a situation occurs, the universal joint may thus pivot the first and chassis relative each other as a result. A universal joint further provides the possibility to arrange additional support wheels to the first chassis without increasing the risk of rotating the entirety of the vehicle if one of the support wheels at the first chassis runs over an uneven portion of the underlying surface.

According to an aspect the upper loading surface comprises a selectively rotational disc-like portion, wherein the upper loading surface at least partly may be rotated relative the vehicle.

This has the advantage that objects, which are to be placed upon, or retrieved from, the upper loading surface, may be so from any angle of the vehicle. If the vehicle itself is not able to rotate to conform with an orientation of for example a forklift, the disc-like portion may rotate the upper loading surface, or parts thereof, instead, wherein loading and retrieval operations may be performed more easily. For an example of a pallet being loading onto the loading surface of the vehicle, this feature may be very beneficial as it may be performed from any angle relative the vehicle. This is especially beneficial in warehouses or similar which are crowded with lesser free space to navigate within.

According to an aspect the vehicle may comprise at least one object sensor for detecting objects in the surroundings of the vehicle, wherein the control unit is arranged to receive information from said object sensor and utilize said information for control of the vehicle.

This has the advantage that a semi- or fully automatic operation of the vehicle is made possible, as the control unit may receive information regarding surrounding objects and operate the vehicle in a proper manner with regards to such objects. The control unit may thus be programmed to drive around such object, or take other appropriate actions based on the size and extension of such a detected object.

According to an aspect the vehicle may comprise a wireless interface for communication with other units of a system, and a navigation device.

This has the advantage that such components provides the possibility of using the vehicle in a combined usage with other additional units, wherein the different units of such a system may communicate with each other to perform a plurality of material handling operations which may require coordinated movement of a plurality of vehicles and/or units. The units described are preferred to be material handling vehicles of same type and/or of different type.

According to an aspect a material handling system is provided. The system may comprise a group of material handling units, said group comprising at least one material handling vehicle comprising a wireless interface for communication with other units of a system, and a navigation device, and at least one additional material handling unit.

This has the advantage that a flexible system with a wide range of usage options is provided. Such a system may further be provided with all the different embodiments and their advantages as described herein with reference to each single vehicle being part of such a system, individually or taken in combination. The units described are preferred to be material handling vehicles of same type and/or of different type.

Additional objectives, advantages and novel features of the invention will be apparent to one skilled in the art from the following details, and through exercising the invention. While the invention is described herein, it should be apparent that the invention may be not limited to the specifically described details. One skilled in the art, having access to the teachings herein, will recognize additional applications, modifications and incorporations in other areas, which are within the scope of the invention.

BRIEF DESCRIPTION OF THE DRAWINGS

Below is a description of, as examples, embodiments with reference to the enclosed drawings, in which.

DETAILED DESCRIPTION

Figure 1A:
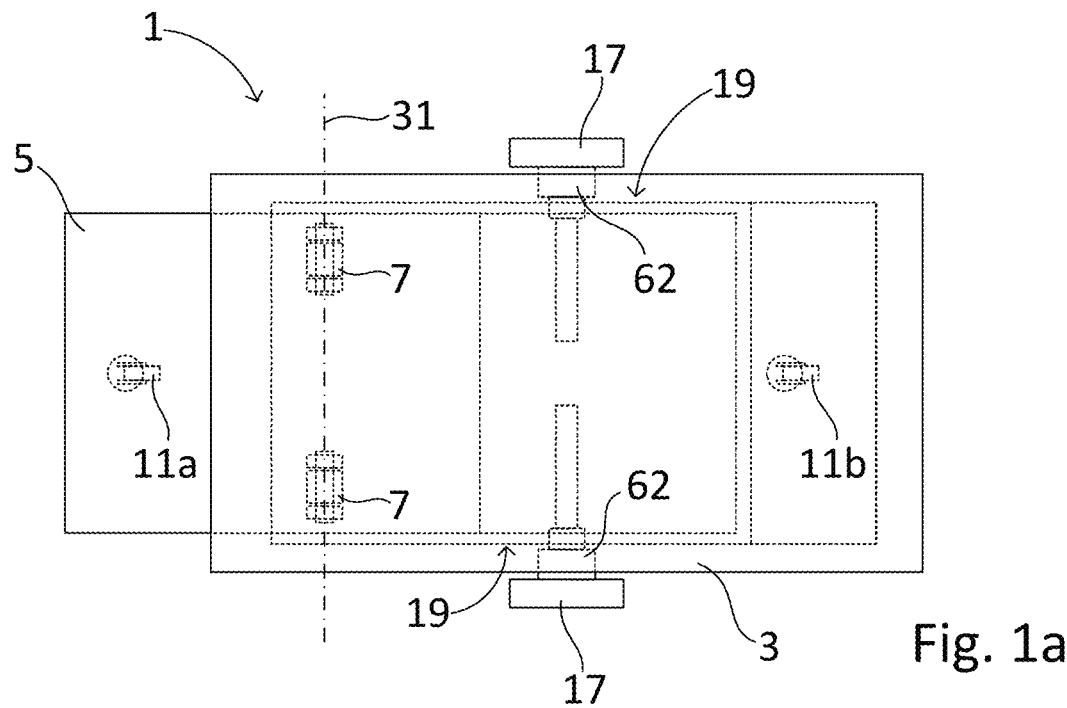
FIGS. 1a and 1b show a vehicle in a top down view and a side view respectively according to an embodiment.

According to a first aspect a material handling vehicle is provided. The material handling vehicle may comprise: an upper loading surface for loading of objects thereon, a control unit, a power source, a drive motor, at least one vehicle drive wheel powered by the drive motor, at least one vehicle support wheel. Further, the vehicle may comprise a first chassis and a second chassis, each of which may comprise at least one wheel of the vehicle, wherein the first and second chassis are pivotally coupled to each other by means of at least one coupling means. The coupling means may further be arranged intermediate the first chassis and the second chassis at a position where the first chassis is arranged above the second chassis, wherein the coupling means extend at least partly vertically between the first and second chassis at said position.

This type of vehicle may have different shape and design but may be most commonly perceived as a rectangular, or close to rectangular, in shape when viewed from above. The vehicle is also to be viewed as a low vehicle, adapted for loading and transportation operations close to ground level. The upper loading surface may thus be easy to use for moving objects around, as lifting said object from and to said loading surface is fast and easy from a ground level. The internal components of the vehicle such as the drive motor, power source, wireless interface, control unit, and navigation device may be any known types of such components and/or device known in the arts. The wheels may be regular wheels or swivel wheels depending on the design of the vehicle and the wheel configuration of said vehicle. For example, for a vehicle comprising a total of four wheels, wherein two wheels are drive wheels and two are support wheels, a common configuration is to position the two drive wheels at least in the vicinity of a centre portion of the vehicle, wherein the two drive wheels are individually controlled and operated. For such a configuration the two support wheels are typically swivel wheels, arranged at opposite ends of the vehicle relative the drive wheels, wherein the vehicle may turn around on the spot by means of the two individually controlled drive wheels rotating in different directions. Such a vehicle will thus provide excellent manoeuvrability by means of such a wheel configuration. However, as it may not be guaranteed that all four wheel are in contact with a surface underneath for such a configuration, due to factors such as loaded objects at the loading surface, a potential uneven surface underneath the vehicle or other, situations may arise where at least one of the drive wheels is not in contact with said surface. By means of dividing the chassis into two portions, said two portions being pivotally coupled to each by means of the at least one coupling means, and distributing the wheels among the two chassis, such contact situations may be alleviated as the first and second chassis may pivot relative each other and by means of said pivoting to provide an adaptable foot print for the vehicle. The coupling means may be of various designs but in is in general terms to be perceived as a mechanical coupling device being able to pivot about at least one first pivoting axis, said first pivoting axis being parallel with a horizontal transversal direction of the vehicle. Different embodiments of such a coupling means will be described in more details within the disclosure.

The amount of vertical overlap of the first and second chassis may vary without deviating from the scope of this feature. The first chassis may comprise an overlapping portion which extends over the second chassis. The entirety of the first chassis may be arranged over the second chassis. Any amount of overlap in-between an overlapping portion and a fully overlapping first chassis is also possible within the claimed disclosure. Regardless of the amount of overlap between the first and second chassis, it is to be understood that the upper loading surface is arranged at the first chassis in such a manner so that an object positioned at the loading surface may not get in contact with the second chassis under normal usage, under the premise that such an object comprises a flat lowermost surface, as such a situation will position an object placed at the upper loading surface above the second chassis.

By means of arranging the coupling means at least partly in a vertical orientation, said coupling means may thus interact with applied forces in a different manner compared to a horizontally arranged coupling means. As the vehicle is designed for moving an object placed upon its upper loading surface, downwards directed forces will thus be of importance with regards to how such forces are interacting with the vehicle and its operation. The weight of the first chassis and any potential object placed thereupon will, depending on the positioning, apply a force component of varying size to the coupling means. By arranging the coupling means at least partly vertically between the first and second chassis, the coupling means may transfer such force components to the second chassis in a direction which corresponds at least in part with the extending direction of said coupling means. By such an arrangement, the coupling means may assist in distributing forces between the first and second chassis as well as providing its pivoting function between the two chassis. As a force applied through a pivot axis does not cause a pivoting, such an arrangement of the coupling means may thus function in the described manner.

According to an aspect the vehicle may comprise two independently controlled drive wheels and at least two support wheels, wherein at least one of the support wheels is arranged at the first chassis and one other support wheel and the two drive wheels are arranged at the second chassis. The total number of support wheels may vary depending on the design of the vehicle and its intended usage. However, a commonly used configuration of wheels is a total of two drive wheels and two support wheels, arranged in a diamond like pattern, wherein the two drive wheels are arranged at, or close to, a centre portion of the vehicle. As the two drive wheels are individually controlled, such a vehicle may turn around by means of a stationary rotation on the spot by means of having the two drive wheels rotate in opposite directions. The two support wheels are hence preferably swivel wheels or similar, wherein the support wheels may turn and follow a rotation of the vehicle without any additional operation of said support wheels. For an example wherein the total number of wheels being four, and being arranged to the vehicle as described herein, such a vehicle comprising four wheels will achieve a contact with an underlying surface in the same manner as a non-pivotally vehicle comprising three wheels, wherein the three wheels of the second chassis achieve contact with said underlying surface as a vehicle having three wheels, wherein the additional fourth wheel of the first chassis is in contact with the same underlying surface in a pivotally manner. The support wheels is as stated previously preferred to be swivel wheels.

According to an aspect the position of the coupling means is arranged in an imaginary vertical plane, which divides the second chassis into two sub-sections, a first sub-section and a second subsection, wherein the two drive wheels are arranged at the first sub-section and the one other support wheel of the second chassis is arranged at the second sub-section of the second chassis. This feature leads to a situation in which the total force of the vehicle acting on an underlying surface, from the weight of the vehicle itself and a potential load positioned thereon, thus will be divided over the total amount of wheels by means of a series of splits. A first split dividing a first force from the first chassis (with or without load) between the at least one support wheel and the coupling means, wherein the first force is split into a second force, acting on the underlying surface through the at least one support wheel, and a third force, acting on the second chassis through the coupling means. The third force is then subsequently split into a fourth force and a fifth force by means of a second split, wherein the fourth force is force acting on the underlying surface through the one other support wheel, and the fifth force is a force acting on the underlying surface through the two drive wheels.

It should be noted that the fifth force is thus to be regarded as the total force acting through the two drive wheels, wherein said total force of course also in practice is divided by said two drive wheels by means of an additional split of forces. For the sake of simplicity however, the additional split may be disregarded in detail, as for a case of a symmetrical vehicle, with or without a load positioned at the upper loading surface, the fifth force should be at least somewhat close to being distributed equally over the two drive wheels.

As should be realized, the resulting forces acting on the underlying surface through the wheels of the vehicle, as well as the third force, may be calculated in size by means of the size of each force applied to a chassis, multiplied by a length of a moment arm corresponding to the specific split from which the force to be calculated relates to. All sizes of such forces are thus associated with moment calculations, wherein the resulting forces are dependent on distances between the positions from where the incoming and outgoing forces of the different splits. By means of designing the vehicle with this in mind, each such distance may be modified so as to provide control over how the forces are distributed over the individual wheels. This may hence be utilized to provide control over how the vehicle responds to the operation of the drive wheels, wherein the manoeuvrability and handling of the vehicle may be improved in a controlled manner.

According to an aspect the coupling means is arranged to the first chassis by means of a first sliding arrangement, selectively operational for moving the coupling means along a longitudinal direction of the first chassis. The first sliding arrangement may thus be utilized so as to modify the distances associated with the moment calculations related to the first split of force, said first split dividing the first force into the second and third force. By means of providing a means for modifying the associated distances of the first split, the resulting forces acting on the individual wheels may be altered which may be used to provide the best possible force distribution between the wheels with regards to any drive wheel arranged at the vehicle. The first sliding arrangement may be comprised of a first rail-like element to which the coupling means may be arranged by means of a first sliding element, arranged to slide along an extension of said rail-like element. The first sliding arrangement may also be comprised of a gear rack and corresponding gears, wherein a centre of such gears may be perceived as a sliding movement relative the gear rack when said gears are rolled along said gear rack. The sliding movement of the coupling means relative the first sliding arrangement may be controlled by first sliding actuator, arranged to control the relative positioning of the coupling means with regards to the first sliding arrangement. The first sliding actuator may be monitored and controlled by means of a control unit of the vehicle so as to in turn control the distances associated with the first split of the first force (with or without additional load on the upper loading surface). An adjustable positioning of the coupling means relative the first chassis may additionally be utilized to also modify the positioning of the first and second chassis relative each other. This may be used for example to temporarily move the upper loading surface of the vehicle even if the vehicle is at a standstill, which may be utilized for a more controlled loading and/or unloading operation with the vehicle. The total length of the vehicle may or may not also be affected by means of such a movement, depending on a length of the first chassis, a length of the second chassis, and their alignment to each other by means of the coupling means. This may provide the possibility of temporarily achieving a longer or shorter vehicle for certain operations and/or circumstances, which may be utilized so as to even further enhance the manoeuvrability of the vehicle in different types of surroundings.

According to an aspect the coupling means is arranged to the second chassis by means of a second sliding arrangement, selectively operational for moving the coupling means along a longitudinal direction of the second chassis. The second sliding arrangement may thus be utilized so as to modify the distances associated with the moment calculations related to the second split of force, said second split dividing the third force into the fourth and fifth force. By means of providing a means for modifying the associated distances of the second split, the resulting forces acting on the individual wheels may be altered which may be used to provide the best possible force distribution between the wheels with regards to any drive wheel arranged at the vehicle. The second sliding arrangement may be comprised of a second rail-like element to which the coupling means may be arranged by means of a second sliding element, arranged to slide along an extension of said rail-like element. The second sliding arrangement may also be comprised of a gear rack and corresponding gears, wherein a centre of such gears may be perceived as a sliding movement relative the gear rack when said gears are rolled along said gear rack. The sliding movement of the coupling means relative the second sliding arrangement may be controlled by second sliding actuator, arranged to control the relative positioning of the coupling means with regards to the second sliding arrangement. The second sliding actuator may be monitored and controlled by means of a control unit of the vehicle so as to in turn control the distances associated with the second split of the third force (with or without additional load on the upper loading surface). An adjustable positioning of the coupling means relative the second chassis may additionally be utilized to also modify the positioning of the first and second chassis relative each other. This may be used for example to temporarily move the upper loading surface of the vehicle even if the vehicle is at a standstill, which may be utilized for a more controlled loading and/or unloading operation with the vehicle. The total length of the vehicle may or may not also be affected by means of such a movement, depending on a length of the first chassis, a length of the second chassis, and their alignment to each other by means of the coupling means. This may provide the possibility of temporarily achieving a longer or shorter vehicle for certain operations and/or circumstances, which may be utilized so as to further enhance the manoeuvrability of the vehicle in different types of surroundings.

By means of combining the features of the first and second sliding arrangement both the first and second split of forces of the vehicle may be modified so as to lower or increase the individual forces by means of changing the distribution of the total amount of force over the wheels of the vehicle. The first and second sliding arrangements may of course individually be designed and function as described prior with reference to the sliding arrangements described individually. The combination of the two do however provide additional functionality due to the coupling means being selectively movable along both the first and the second sliding arrangements, either as separate operations or in combination performed simultaneously. If keeping the relative positioning of the first and second chassis constant, and assuming that the vehicle comprises two drive wheels, arranged at a centre or in the vicinity of the centre of the vehicle at the second chassis, the coupling means may be moved along both sliding arrangements as a means to lower or increase the forces acting between the two drive wheels and the underlying surface. If for example the coupling means is moved towards the centre of the vehicle by means of a sliding movement along both the first and second sliding arrangements simultaneously, the distances affecting moment calculations with regards to the drive wheels will get shorter, and hence more force will be directed to said drive wheels. On the contrary, if the coupling means is moved away from the centre and the thus the drive wheels, the opposite will occur and the forces distributed to the drive wheels will be lowered. This may hence be utilized as a means of controlling how much force the drive wheels will handle, which then may be lowered or increased to achieve the best possible traction for the drive wheels and thus the best possible manoeuvrability of the vehicle.

According to an aspect the vehicle, which comprises a first and/or a second sliding arrangement further comprises sensor means arranged for monitoring the amount of force applied to the at least one drive wheel, wherein the control unit is arranged to control the positioning of the coupling means relative at least one sliding arrangement based on a value given by said sensor means, so as to adjust said amount of force to the at least one drive wheel. Such sensor means may be provided to the vehicle in a various ways, and may monitor the forces in correspondingly different manners. A scale may be provided to a drive shaft of the at least one drive wheel to simply measure the weight applied to said wheel, wherein the measured weight may be compared to known values of such a weight for the vehicle when not loaded with an object. If the at least one drive wheel comprises a tubing which may be filled with air, a pressure sensor may as well be arranged within the wheel so as to monitor the internal pressure and fluctuations thereof, wherein the pressure and/or pressure fluctuations may be used to calculate said forces. The control unit may then be provided with a signal from the sensor means wherein the control unit may shift the positioning of the coupling means relative the first and/or second chassis as deemed appropriate. The control unit may be programmed to act on such signals in various manners as well. For example, the control unit may be set up so as to only move the coupling means when the forces go below or above certain predetermined thresholds, which thresholds correspond to values deemed as less preferred and/or impairing the manoeuvrability of the vehicle. The control unit may also be set up so as to constantly shift the positioning of the coupling means so as to strive for providing the drive wheels with as constant operational conditions as possible.

According to an aspect the vehicle further comprises a tilting device, arranged for controllably tilting the first chassis relative the second chassis about the at least one coupling means. The tilting device may be designed by means of a plurality of mechanical devices. A controllable link arm arrangement may be provided between the first and second chassis for example, or a hydraulic cylinder may be arranged to push the two chassis apart so as to achieve the tilting function. Such a hydraulic cylinder may be arranged at the first or the second chassis, intermediate said two chassis, and be arranged to not be in contact with the opposite chassis when the vehicle is used under normal operation. When tiling is desired, the hydraulics may be used to displace a piston towards to opposite chassis and thus push the two chassis apart so as to achieve the tilting.

According to an aspect the vehicle further comprises at least one stopping element, arranged so as to restrict the pivoting of the first and the second chassis relative each other, so that said pivoting may not exceed a predetermined angle. The at least one stopping element may be arranged at the first or the second chassis, intermediate said two chassis and extending towards the opposite chassis. The at least one stopping element may be a projection or similar, which is designed to have an extending length which mechanically restrict pivoting when the opposite positioned chassis reaches said element. The at least one stopping element may further be comprised with a resilient material at an end portion directed towards the opposite chassis, wherein said resilient material may dampen impacts between the at least one stopping element and the first or second chassis, whichever chassis it is arranged to abut when pivoting occurs.

According to an aspect the coupling means comprises at least one pivot shaft about which the first and second chassis may pivot relative to each other. The pivot shaft may be any sort of commonly used shaft for such a device, such as a steel rod or similar. The pivot shaft may further comprise friction lowering devices and/or elements such as bearings and/or low friction material such as Teflon or similar. If a plurality of coupling means are arranged between the first and second chassis, said plurality of coupling means will correspondingly comprise a plurality of pivot shafts, wherein said plurality of pivot shafts are aligned along the same pivot axis.

According to an aspect the coupling means comprises a universal joint, for example, about which the first and second chassis may pivot relative to each other in a plurality of directions. The universal joint may thus provide a two-dimensional pivoting of the first and second chassis relative each other. The first and second chassis may thus pivot about two pivoting axes, wherein one of said two axes being the first pivoting axis, and the other being a second pivoting axis, second pivoting axis being parallel with a horizontal longitudinal direction of the vehicle. Such a universal joint may have various shape and design without deviating from the scope of protection of the disclosure. By means of arranging a universal joint in the manner described, wherein the pivoting axes are aligned as defined herein, the universal joint will not affect the manoeuvrability of the vehicle as the universal joint will now allow for pivoting about a vertical axis, which would correspond to a left or right turning of the vehicle when operated under normal circumstances.

As an alternate embodiment, the coupling means of the vehicle may also comprise a ball joint or similar for example, wherein the pivoting of the first and second chassis relative each other may be a three-dimensional pivoting, due to a ball joint allowing for simultaneous rotation/pivoting about three orthogonal axes of a three-dimensional coordinate system. As such a three-dimensional pivoting thus allows for turning of the vehicle by means of pivoting the first and second chassis relative each other about a vertical axis, such an embodiment needs to take this into consideration regarding wheel positioning and the types of wheels used for such a vehicle. For certain applications a coupling means in the form of a ball joint or similar may provide alternative advantages as the vehicle may exhibit an alternative movement scheme. The vehicle may, as an example, be able to move around corners in tighter spaces due to the first and second chassis being able to move and turn as an articulated vehicle.

According to an aspect the upper loading surface comprises a selectively rotational disc-like portion, wherein the upper loading surface at least partly may be rotated relative the vehicle. The disc-like portion may be a portion of upper loading surface, or the first loading surface in its entirety. If the selectively rotational disk-like portion is arranged as part of the loading surface, the disc-like portion may further comprise a lifting device which lifts the disc-like portion upwards relative the remainder of such a loading surface, so as to avoid an object placed thereupon to drag against the non-rotational portion/portions of such a loading surface. The disc-like portion is thus slightly elevated from the upper surface of the chassis, rotated to a desired angle and then lowered back to its original height, wherein an object placed thereupon achieves a correct positioning. The vehicle itself may often exhibit a substantially rectangular base area, wherein such a vehicle may drive through narrow spaces only in its narrower width. This may result in the vehicle being required to move and be positioned in a certain direction at certain locations within for example a warehouse. By means of comprising the selectively rotational disc-like portion into/at the upper loading surface, a forklift or a similar material handling device or tool may not be as restricted in combined usage with a vehicle comprising said feature. The loading of an object, from or to such a vehicle may be performed even if the angle of loading is separate to the driving orientation of the vehicle, due to the selective rotation of the loading surface, in full or in part.

According to an aspect the vehicle may comprise at least one object sensor for detecting objects in the surroundings of the vehicle, wherein the control unit is arranged to receive information from said object sensor and utilize said information for control of the vehicle. Depending on its intended usage the vehicle may comprise different types of, and a different plurality of such an object sensor. Such a sensor may comprise any sort of detection function according to known art, such as magnetic field detection, IR-detection, LIDAR, laser, optical or others for example. The positioning of one or more such sensors may also vary in detail but each sensor may preferably be arranged at a circumference of the vehicle so as to be able to detect objects in the most optimal manner. The control unit may be configured to handle information regarding detected objects in a plurality of ways, such as identifying the object to determine if it is possible to drive around said object, or if the vehicle needs to find another route or come to a full stop etc. For example, two or more objects sensors may be arranged to detect an object in the same vertical orientation, wherein the combined object sensor may be able to determine if a detected object is an object lying on the floor or a wall or similar. The control unit may then be configured to automatically control the vehicle in the most likely best possible manner, as in driving around or over a very low objet, or to turn sideway or completely turn around if a wall and/or a larger type of object is detected etc.

According to an aspect the vehicle may comprise a wireless interface for communication with other units of a system, and a navigation device. Such a wireless interface may be utilized both as a means of communicating with a remote control or similar, and also to communicate with other vehicles or similar types of units. Thus the vehicle may easily be configured to function either as individual vehicles or as units of a system performing material handling operations which may require a plurality of such vehicles. The units described are preferred to be material handling vehicles of same type and/or of different type.

According to an aspect a material handling system is provided. The system may comprise a group of material handling units, said group comprising at least one material handling vehicle according to the disclosure and at least one additional material handling unit. Such a system may be a group of vehicles according to the disclosure, being operated individually or in a hive-like manner. One or more such vehicles may be configured as master units, wherein the remainder of the vehicles may be configured as slave units, which are to follow the lead of one or more master units. The at least one additional material handling unit may also be another type of vehicle such as a forklift or similar, wherein such a forklift may be configured to function as a master unit and have one or more material handling vehicles as associated slave units coupled thereto. Such a system may thus be adapted to optimize a wide range of different types of material handling operations, so as to increase efficiency and/or the speed of such operations.

DETAILED DESCRIPTION OF THE DRAWINGS

The detailed description with reference to the embodiments depicted are to be viewed as exemplary embodiments comprising a combination of certain features, which features have been described in detail above. It is thus to be understood that additional embodiments may be achieved by combining other features into embodiments not depicted herein. The figures are to be viewed as examples and not mutually exclusive combinations. It should also be noted that all figures shown and described are schematically represented, wherein generic parts of machinery is not depicted for the sake of simplicity.

Figure 1B:
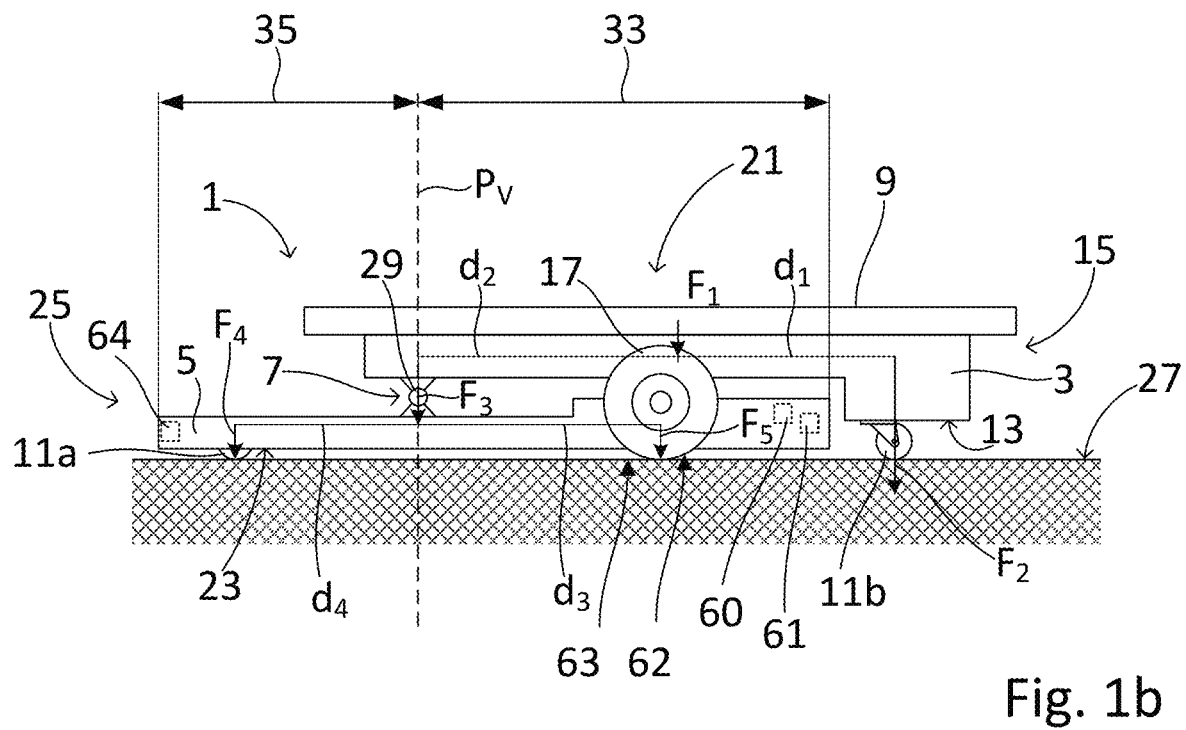

FIGS. 1a and 1b show a vehicle 1 in a top down view and a side view respectively according to an embodiment. The vehicle 1 may, as depicted in FIGS. 1a and 1b comprise a chassis, which is divided into two portions, namely a first chassis 3 and a second chassis 5, wherein the first and second chassis 3, 5 are pivotally coupled together by means of two coupling means 7. The coupling means 7 are arranged at positions where the first chassis 3 is arranged above the second chassis 5, wherein the coupling means 7 extend vertically between the first and second chassis 3, 5 at said positions. The first chassis 3 may further comprise an upper loading surface 9 for loading of objects thereon, and a support wheel 11b in the form of a swivel wheel, arranged at a lower surface 13 of the first chassis, in the vicinity of a front portion 15 of the vehicle 1. The second chassis 5 may comprise two independently operational drive wheels 17, arranged at opposite side portions 19 of the second chassis 5, in the vicinity of a centre portion 21 of the vehicle 1, and a support wheel 11a in the form of a swivel wheel, arranged at a lower surface 23 of the second chassis 5, in the vicinity of a back portion 25 of the vehicle 1.

The distribution of the wheels 11a, b, 17 of the vehicle 1 as depicted in FIGS. 1a and 1b provides an excellent handling and manoeuvrability for the vehicle 1 as it may turn around by means of a rotation on the spot as the two drive wheels 17 are independently controlled and the swivel wheels may follow such a rotation of the vehicle 1. By means of the wheel positioning the footprint of the vehicle 1 is defined by the four wheels 11a, b, 17 of the vehicle 1 in contact with an underlying surface 27. However, as the first and second chassis 3, 5 are pivotally coupled to each other, said footprint will be comprised of two sub-footprints of the first and second chassis 3, 5 respectively. The three wheels 11a, 17 of the second chassis 5 will thus provide a three wheel footprint wherein the two drive wheels 17 are assured to be in a reliable contact with the underlying surface 27 which results in the previously proclaimed reliable handling and manoeuvrability for the vehicle 1. Any load positioned at the upper loading surface 9, and the weight of the vehicle 1 itself will be distributed over the four wheels 11a, b, 17 due to the pivotally coupling of the two chassis 3, 5, while still providing the benefit of the two drive wheels 17 being in contact with the underlying surface 27 as part of a three wheeled footprint.

The two coupling means 7 as shown in FIGS. 1a and 1b comprises one pivot shaft 29 each, about which the first and second chassis 3, 5 may pivot relative to each other. The two pivots shafts 29 will thus constitute a common first pivot axis 31 for the pivoting of the first and second chassis 3, 5 relative each other. The position of the coupling means 7 is further arranged in an imaginary vertical plane $P_V$, which divides the second chassis 5 into two sub-sections, a first sub-section 33 and a second subsection 35, wherein the two drive wheels 17 are arranged at the first sub-section 33 and the one support wheel 11a of the second chassis 5 is arranged at the second sub-section 35 of the second chassis 5. This ensures that the weight of the first chassis 3, any and any additional force provided thereto from an object or similar, will be applied to the second chassis 5 within the three wheeled footprint of the second chassis 5. This in turn leads to a configuration in which the two drive wheels 17 are configured to always be in proper contact with the underlying surface 27 which ensures their function as operational wheels of the vehicle 1 to function in an appropriate manner.

The total force of the vehicle 1 acting on the underlying surface 27, from the weight of the vehicle 1 itself and a potential load positioned thereon, will thus be divided over the total amount of wheels 11a, b, 17 by means of a series of splits as previously disclosed. A first split is dividing a first force $F_1$ from the first chassis 3 (with or without load) between the support wheel 11b of the first chassis 3 and the coupling means 7. The first force $F_1$ is thus split into a second force $F_2$, acting on the underlying surface 27 through the support wheel 11b of the first chassis 3, and a third force $F_3$, acting on the second chassis 5 through the coupling means 7. The third force $F_3$ is then subsequently split into a fourth force $F_4$ and a fifth force $F_5$ by means of a second split, wherein the fourth force $F_4$ is force acting on the underlying surface 27 through the support wheel 11a of the second chassis 5, and the fifth force $F_5$ is a force acting on the underlying surface 27 through the two drive wheels 17 (the fifth force is thus to be perceived as the total force of two equal forces of the two drive wheels combined).

How these forces are distributed over the vehicle 1 and its wheels 11a, b, 17 may easily be calculated if desired, by means of equilibrium and moment calculations. The weights of the first and second chassis 3, 5, and a potential object which is to be positioned at the upper loading surface, may simply be weighed, wherein their individual weights may be perceived as applied forces due to gravity at a centre of gravity for each such object. As seen in FIG. 1b, the first split will result in two distances $d_1$, $d_2$ associated with the second and third forces $F_2$, $F_3$ which are split from the first force $F_1$. A first distance $d_1$ may be defined as the distance between the centre of gravity of the first chassis (which may or may not be combined with a centre of gravity of an object placed thereupon) and the support wheel 11b of the first chassis 3. A second distance $d_2$ may correspondingly be defined as the distance between said centre of gravity of the first chassis (with or without an object) and the coupling means 7. (Note: the centre of gravity is herein approximated for the sake of simplicity and understanding). In a similar manner the second split will result in two distances $d_3$, $d_4$ associated with the fourth and fifth forces $F_4$, $F_5$ which are split from the third force $F_3$. A third distance $d_3$ may thus be defined by the distance between the coupling means 7 and the drive wheels 17, and a fourth distance $d_4$ may be defined by the distance between the coupling means 7 and the support wheel 11a of the second chassis 5. For the sake of simplicity no calculations or equations are presented herein, and are to be viewed as well-known in the arts with respect to how they are performed.

The two chassis may also comprise a plurality of internal components coupled thereto, the components being; a power source 61, a drive motor 62 for powering the drive wheels, at least one object sensor 64 for detecting objects in the surroundings of the vehicle. The vehicle may further comprise a wireless interface 57 for communication with other units of a system in which the vehicle may be comprised, a control unit 60, and a navigation device 59, see FIG. 1-6. The units being other material handling vehicles of the same type or material handling vehicles of different type.

Figure 2A:
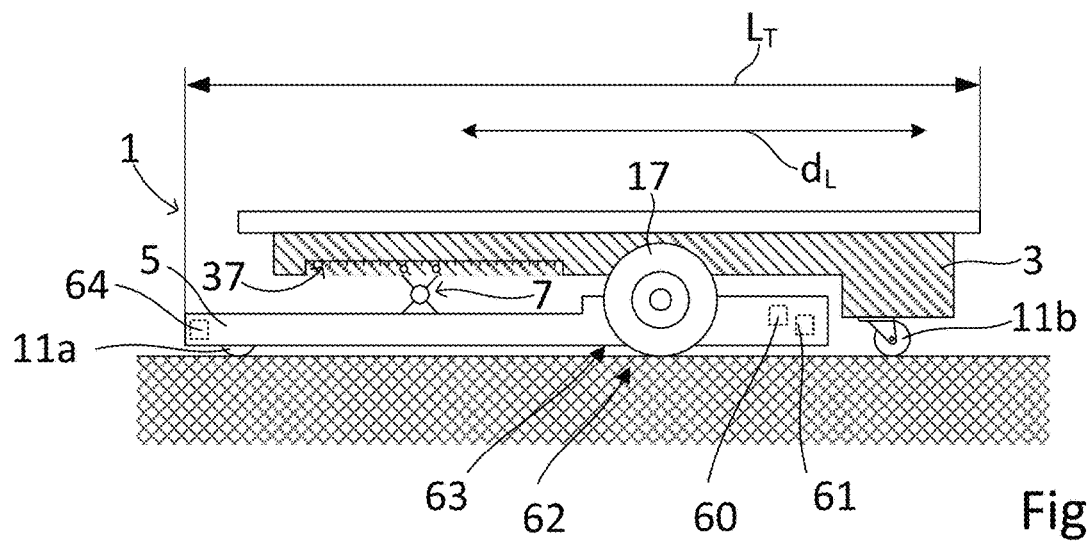
FIG. 2a-2c show a vehicle in side views according to different embodiments.
Figure 2B:
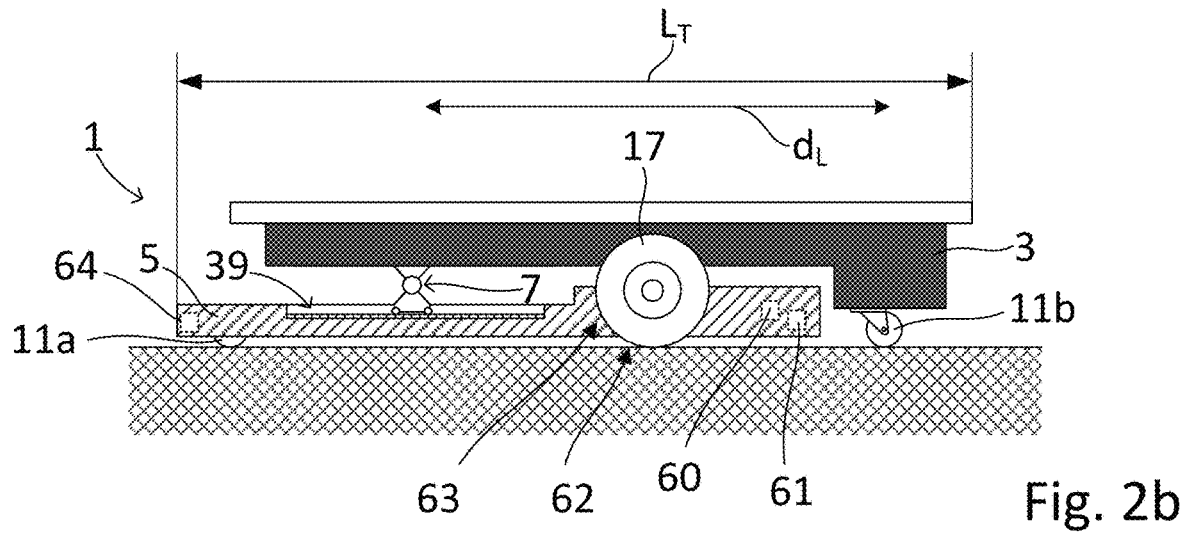
Figure 2C:
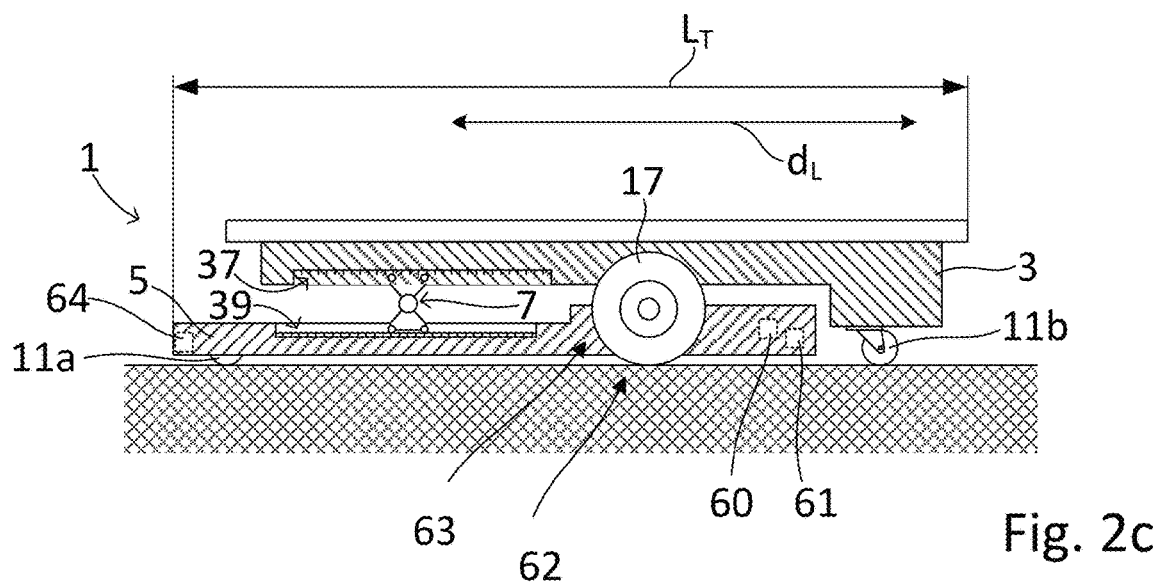

FIG. 2a-2c show a vehicle 1 in side views according to different embodiments. The embodiments of the vehicle 1 as presented in FIG. 2a-2c may be perceived as similar to the one presented in FIGS. 1a and 1b, but with added features related to how the coupling means 7 is connected to the first and/or second chassis 3, 5.

FIG. 2a depicts a vehicle 1 comprises a first sliding arrangement 37, wherein the coupling means 7 is arranged to the first chassis 3 by means of said first sliding arrangement 37. The first sliding arrangement 37 is, as described previously, selectively operational for moving the coupling means 7 along a longitudinal direction $d_L$ of the first chassis 3. The coupling means 7 is thus fixedly coupled to the second chassis 5, wherein the third and fourth distances $d_3$, $d_4$, as described with reference to FIG. 1b, will remain fixed which results in the same type of distribution of force related to the second split of force. The first split will however be modifiable in its distribution of force as a longitudinal movement of the coupling means 7 relative the first chassis 3 is directly corresponding to the second distance $d_2$ as defined with reference to FIG. 1b. The first sliding arrangement 37 may thus provide the possibility of controlling how much force that will be directed to the support wheel 11b of the first chassis 3 and to the second chassis 5 respectively.

FIG. 2b depicts a vehicle 1 comprises a second sliding arrangement 39, wherein the coupling means 7 is arranged to the second chassis 5 by means of said second sliding arrangement 39. The second sliding arrangement 39 is, as described previously, selectively operational for moving the coupling means 7 along a longitudinal direction $d_L$ of the second chassis 5. The coupling means 7 is thus fixedly coupled to the first chassis 3, wherein the first and second distances $d_1$, $d_2$, as described with reference to FIG. 1b, will remain fixed which results in the same type of distribution of force related to the first split of force. The second split will however be modifiable in its distribution of force as a longitudinal movement of the coupling means 7 relative the second chassis 5 is directly corresponding to the third and fourth distances $d_3$, $d_4$ as defined with reference to FIG. 1b. The second sliding arrangement 39 may thus provide the possibility of controlling how much force will be directed to the support wheel 11a of the second chassis 5 and to the drive wheels 17 respectively.

The vehicle of FIG. 2c may be perceived as a combination of the vehicle 1 of FIGS. 2a and 2b, wherein the coupling means 7 is arranged to the first chassis 3 by means of a first sliding arrangement 37, and to the second chassis 5 by means of a second sliding arrangement 39. As should be obvious, the second, third and fourth distances $d_2$, $d_3$, $d_4$ are thus all modifiable by means of this combination of features. It is also more clearly seen that the embodiment of FIG. 2c provides the possibility of changing the position of the coupling means 7 without affecting a total length $L_T$ of the vehicle 1, wherein a movement of the coupling means 7 according to FIGS. 2a and 2b may change said total length $L_T$ of the vehicle 1 depending on design choices associated with the first and second chassis 3, 5 and their respective lengths. The embodiment of FIG. 2c will however be able to move the coupling means 7 without affecting the total length $L_T$ of the vehicle 1, as the coupling means 7 may move along the first and second sliding arrangements 37, 39 simultaneously. This may hence be utilized to ensure that the contact between the drive wheels 17 and the underlying surface 27 may be as close to an optimum as possible at any given time and for any given load applied to the vehicle 1.

The vehicle of any of FIG. 2a, 2b or 2c may further comprise sensor means 63 arranged for monitoring the amount of force applied to the drive wheels 17, wherein the control unit 60 is arranged to control the positioning of the coupling means 7 relative at least one sliding arrangement 37, 39 based on a value given by said sensor means 63, so as to adjust said amount of force to the drive wheels 17. The vehicle 1 may thus be provided with an automatic system for adjusting the force distribution over the wheels 11a, b, 17 of the vehicle 1, which may be utilized as a means of optimizing the manoeuvrability of the vehicle 1 in an automatic manner.

Figure 3:
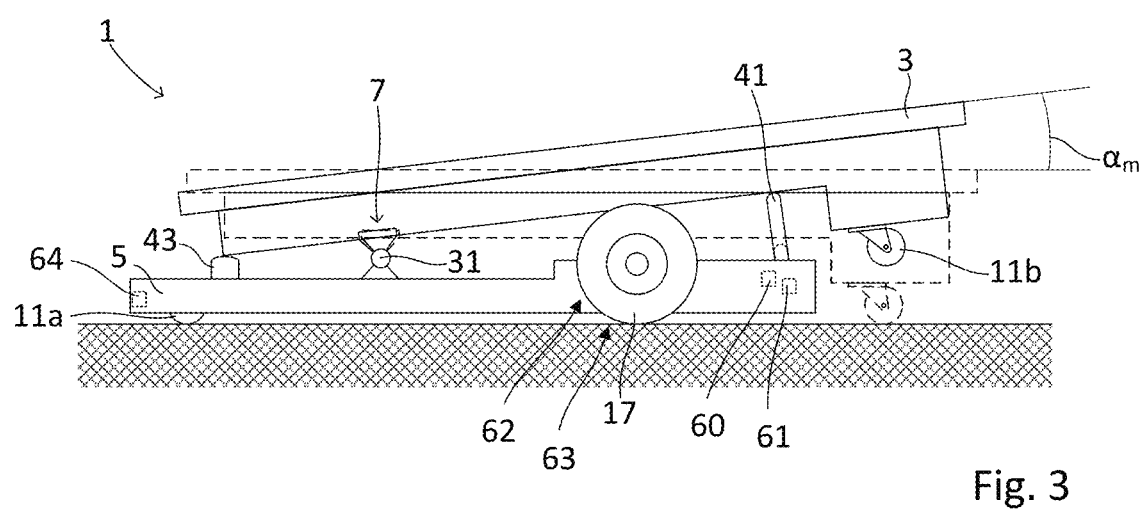
FIG. 3 shows a vehicle in a side view according to an embodiment.

FIG. 3 shows a vehicle 1 in a side view according to an embodiment. The vehicle 1 may, as depicted in FIG. 3 comprise a tilting device 41 and a stopping element 43. The tilting device 41, herein depicted as a displaceable elongated member, such as for example a hydraulic cylinder, may in a controllable manner be displaced from the second chassis 5 towards the first chassis 3 until the first chassis 3 it pivoted about the first pivot axis 31 of the coupling means 7. The vehicle 1 as shown herein may be perceived as comprising three wheels 11a, 17 in total at the second chassis 5, wherein said three wheels 11a, 17 provides a stable contact with the underlying surface 27 while the first chassis 3 is pivoted by means of the tilting device 41. In FIG. 3 the first chassis 3 is tilted to a predetermined maximum tilting angle $\alpha_m$, at which angle further tilting is prevented by means of the stopping element 43, arranged at the second chassis 5. The stopping element 43 may further comprise a movable portion so as to be adjustable in height. Thereby the stopping element 43 may provide a plurality of angles specified for different circumstances, such as having one predetermined angle for moving conditions, and one other predetermined angle for loading conditions etc.

Figure 4A:
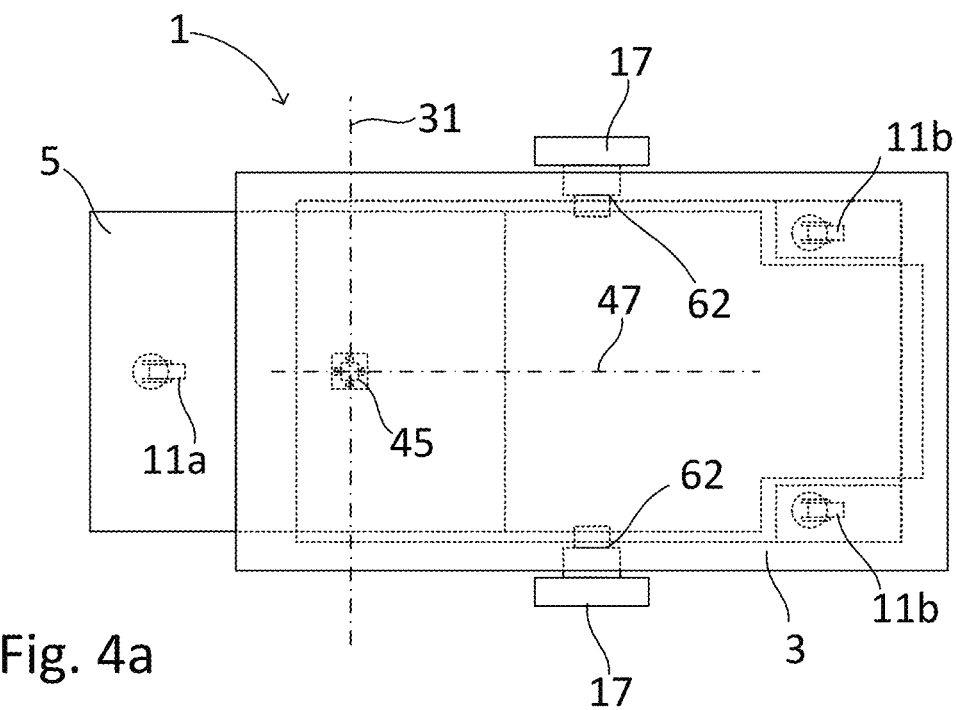
FIGS. 4a and 4b show a vehicle in a top down view and a side view respectively according to an embodiment.
Figure 4B:
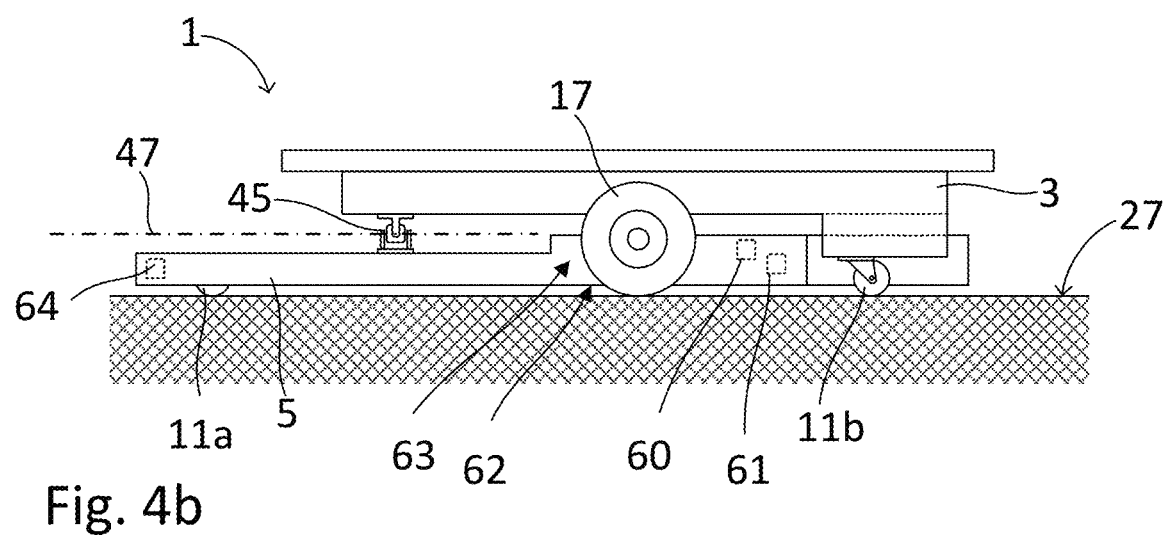

FIGS. 4a and 4b show a vehicle 1 in a top down view and a side view respectively according to an embodiment. The vehicle 1 according to FIGS. 4a and 4b comprises a universal joint 45 about which the first and second chassis 3, 5 may pivot relative to each other in a plurality of directions. The universal joint 45 of this embodiment is arranged so as to be able to pivot a about the first pivot axis 31, similar to the first pivot 31 axis as described with reference to FIG. 1a, and an additional second pivot axis 47, as shown in FIG. 4b. As is shown in FIG. 4a, the vehicle 1 may comprise two support wheels 11b arranged at the first chassis 3, wherein said two support wheels 11b are arranged to extend down towards the underlying surface 27 on transversal sides of an extending front portion of the second chassis 5. The vehicle 1 thus exhibits a five wheel footprint, which is a combination of a three wheel footprint of the second chassis 5 and a two wheel footprint of the first chassis 3. By means of the universal joint 45, and the two pivot axes 31, 47 about which the first and second chassis 3, 5 may pivot relative each other, the three wheels 11a, 17 of the second chassis 5 and the two wheels 11b of the first chassis 3 may all be in proper contact with the underlying surface 27 even if said surface contains an irregular surface structure in several directions. The total footprint of the vehicle 1 may thus be further increased (compared to for example the vehicle of FIGS. 1a and 1b) without risking any of the wheels 11a, b, 17 leaving the underlying surface 27 which could impair the manoeuvrability of the vehicle 1.

Figure 5A:
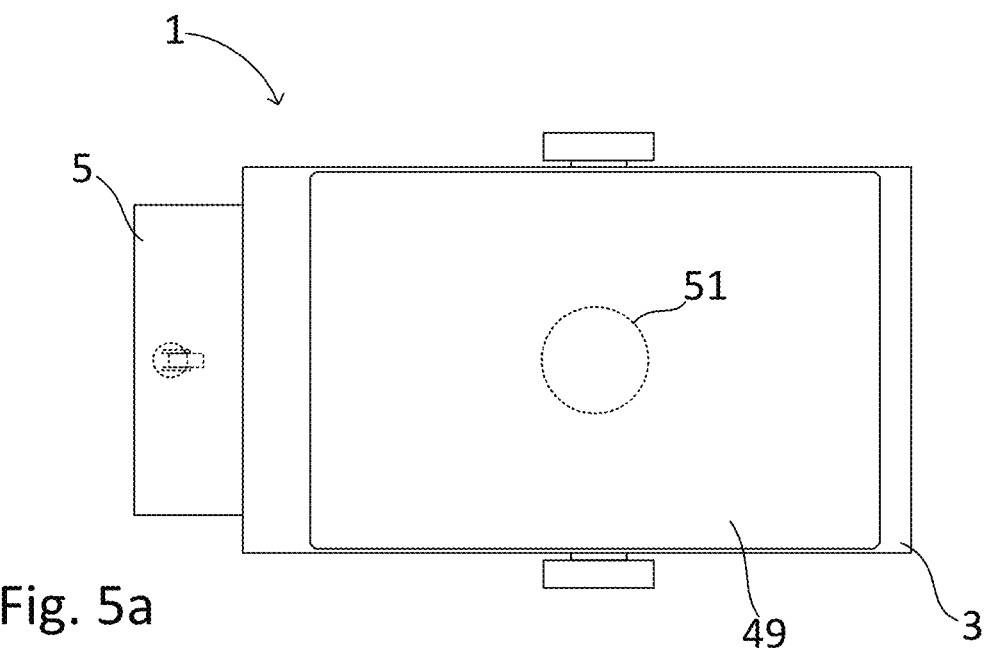
FIGS. 5a and 5b show a vehicle in a top down view and a side view respectively according to an embodiment.
Figure 5B:
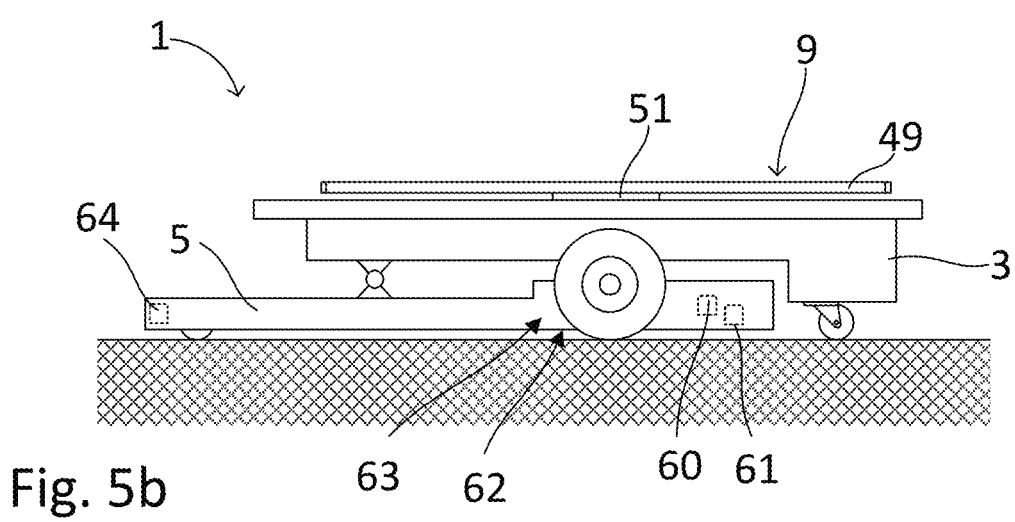

FIGS. 5a and 5b show a vehicle 1 in a top down view and a side view respectively according to an embodiment. The embodiment shown herein is similarly to the embodiment of FIGS. 1a and 1b but with the additional feature of the upper loading surface 9 comprising a selectively rotational disc-like portion 49, wherein the upper loading surface 9 at least partly may be rotated relative the vehicle 1. The selectively rotational disc-like portion 49 is arranged to the first chassis 3 by means of a rotational middle shaft 51 which may lift and lower the disc-like portion 49 from and towards the first chassis 3, and also rotate said disc-like portion 49 relative the first chassis 3. The vehicle 1 is thus more flexible with regards to loading and unloading operations of objects from and to the vehicle 1 as the rotational disc-like portion 49 makes the upper loading surface 9 accessible from all possible angles.

Figure 6:
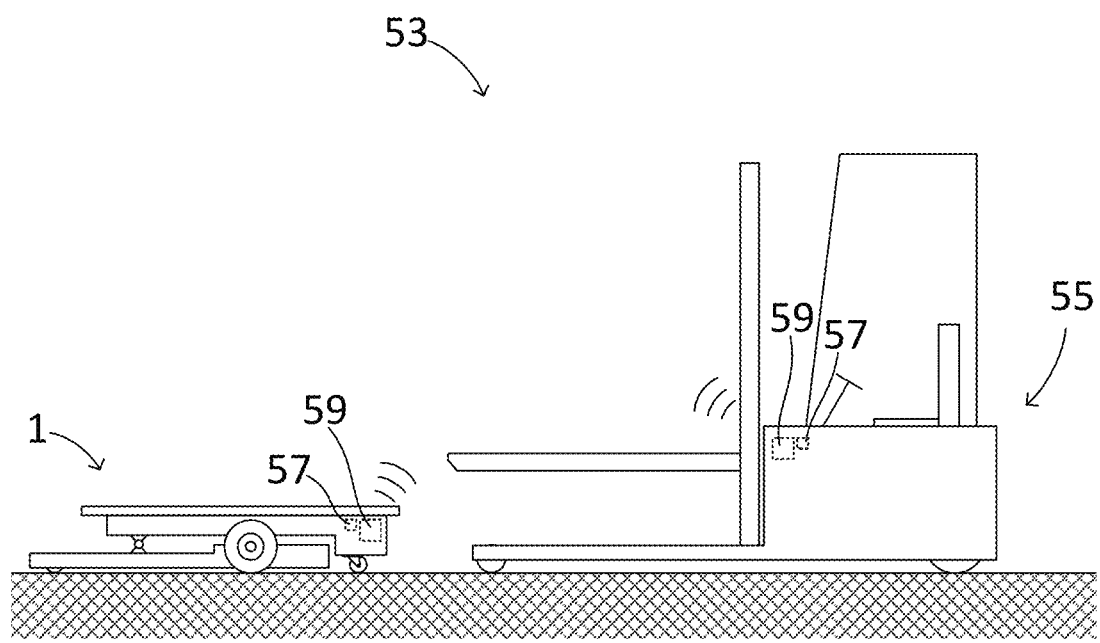
FIG. 6 shows a system comprising a vehicle and a forklift according to an embodiment.

FIG. 6 shows a system 53 comprising a vehicle 1 and a forklift 55 according to an embodiment. The vehicle 1 may be perceived as a vehicle 1 similar to that of FIGS. 1a and 1b for example, but other embodiments of the vehicle 1 according to the disclosure are also possible as part of such a system 53. The vehicle 1 and the forklift 55 each comprise a wireless interface 57 for communication with other units of a system, and a navigation device 59. Thereby the vehicle 1 and the forklift 55 may communicate with each other and thus work together so as to perform more complex material handling operations. The forklift 55 depicted in FIG. 6 is just an example of a forklift, wherein any model or type of forklift of course may be used in such a system 53. Furthermore, the number of vehicles 1 and forklifts 55 may vary without deviating from the scope of protection. It is also to be understood that the forklift 55 is herein to be viewed as one additional material handling unit of the system 53 as disclosed. However, such an additional material handling unit may also be an additional vehicle 1, wherein a system 53 may comprise only a plurality of material handling vehicles 1 according to the disclosure.

The foregoing description of the embodiments has been furnished for illustrative and descriptive purposes. It is not intended to be exhaustive, or to limit the embodiments to the variants described. Many modifications and variations will obviously be apparent to one skilled in the art. The embodiments have been chosen and described in order to best explicate principles and practical applications, and to thereby enable one skilled in the art to understand the invention in terms of its various embodiments and with the various modifications that are applicable to its intended use. The components and features specified above may, within the framework of the embodiments, be combined between different embodiments specified.

The invention claimed is:

1. A material handling vehicle comprising:
an upper loading surface for loading of objects thereon,
a control unit,
a power source,
a drive motor,
at least two independently controllable vehicle drive wheels powered by the drive motor,
at least a first vehicle support wheel and a second vehicle support wheel,
a first chassis and a second chassis, wherein the first and second chassis are pivotally coupled to each other by a coupling, wherein the coupling is arranged intermediate the first chassis and the second chassis at a position where the first chassis is arranged above the second chassis,
wherein the first vehicle support wheel is arranged on the first chassis, and wherein the first vehicle support wheel is positioned at a distance in a longitudinal direction from the at least two independently controllable vehicle drive wheels, and wherein the first vehicle support wheel is a swivel wheel, and
wherein the coupling extends at least partly vertically between the first and second chassis at the position,
wherein the second vehicle support wheel and the two vehicle drive wheels are arranged at the second chassis.

2. The material handling vehicle according to claim 1, wherein the position of the coupling is arranged in an imaginary vertical plane (PV), which divides the second chassis into two sub-sections, a first sub-section and a second sub-section, wherein the two vehicle drive wheels are arranged at the first sub-section and the second vehicle support wheel of the second chassis is arranged at the second sub-section of the second chassis.

3. The material handling vehicle according to claim 1, wherein the coupling is arranged to the first chassis by a first sliding arrangement, selectively operational for moving the coupling along a longitudinal direction (dL) of the first chassis.

4. The material handling vehicle according to claim 1, wherein the coupling is arranged to the second chassis by a second sliding arrangement, selectively operational for moving the coupling along a longitudinal direction (dL) of the second chassis.

5. The material handling vehicle according to claim 1, further comprising sensor arranged for monitoring the amount of force applied to at least one of the two vehicle drive wheels, wherein the control unit is arranged to control the positioning of the coupling relative to the at least one sliding arrangement based on a value given by the sensor, so as to adjust the amount of force to the at least one of the two vehicle drive wheels.

6. The material handling vehicle according to claim 1, wherein it further comprises a tilting device, arranged for controllably tilting the first chassis relative the second chassis about the coupling.

7. The material handling vehicle according to claim 1, wherein it further comprises at least one stopping element, arranged so as to restrict the pivoting of the first and the second chassis relative each other, so that said pivoting does not exceed a predetermined angle.

8. The material handling vehicle according to claim 1, wherein the coupling comprises at least one pivot shaft about which the first and second chassis pivot relative to each other.

9. The material handling vehicle according to claim 1, wherein the coupling comprises a universal joint about which the first and second chassis pivot relative to each other in a plurality of directions.

10. The material handling vehicle according to claim 1, wherein the upper loading surface comprises a selectively rotational disc-like portion, wherein the upper loading surface at least partly may be rotated relative the vehicle.

11. The material handling vehicle according to claim 1, further comprising at least one object sensor for detecting objects in the surroundings of the vehicle, wherein the control unit is arranged to receive information from said object sensor and utilize said information for control of the vehicle.

12. The material handling vehicle according to claim 1, further comprising a wireless interface for communication with other units of a system, and a navigation device.

13. The material handling vehicle according to claim 1, wherein the coupling is arranged to the first chassis by a first sliding arrangement, selectively operational for moving the means along a longitudinal direction (dL) of the first chassis, and
wherein the coupling is arranged to the second chassis by a second sliding arrangement, selectively operational for moving the coupling along the longitudinal direction (dL) of the second chassis.

14. The material handling vehicle according to claim 13, further comprising a sensor arranged for monitoring the amount of force applied to at least one of the two vehicle drive wheels, wherein the control unit is arranged to control the positioning of the coupling relative at least one of the first sliding arrangement and the second sliding arrangement based on a value given by the sensor, so as to adjust the amount of force to the at least one of the two vehicle drive wheels.

15. A material handling system comprising:
a group of material handling units, said group comprising at least one material handling vehicle according to claim 1, and at least one additional material handling unit.

* * * * *